(12) United States Patent
Garcia

(10) Patent No.: US 6,761,249 B2
(45) Date of Patent: Jul. 13, 2004

(54) SUPPORT SUCH AS A TRESTLE OR A STEPLADDER

(76) Inventor: Raymond Garcia, 10 rue Pierre Masse, F-11150 Bram (FR)

(*) Notice: Subject to any disclaimer, the term of this patent is extended or adjusted under 35 U.S.C. 154(b) by 0 days.

(21) Appl. No.: 10/309,129

(22) Filed: Dec. 4, 2002

(65) Prior Publication Data

US 2003/0132061 A1 Jul. 17, 2003

Related U.S. Application Data

(63) Continuation-in-part of application No. PCT/FR01/01727, filed on Jun. 5, 2001.

(30) Foreign Application Priority Data

Jun. 5, 2000 (FR) .............................. 00 07135
Feb. 14, 2002 (FR) .............................. 02 01830

(51) Int. Cl.$^7$ ............................. E04G 1/34; E04G 1/32
(52) U.S. Cl. ...................................... 182/153; 182/225
(58) Field of Search ................................ 182/153, 151, 182/224, 225, 182.4, 155, 186.5, 186.2, 186.1, 181.1; D67/62

(56) References Cited

U.S. PATENT DOCUMENTS 3,139,951 A    7/1964   Clayton
3,175,642 A  * 3/1965   Neeley ........................ 182/224
3,583,676 A  * 6/1971   Yamakawa ................... 256/64
3,978,943 A  * 9/1976   Greenman et al. .......... 182/155
4,823,913 A  * 4/1989   Riegel, Jr. ................... 182/225
4,836,332 A  * 6/1989   Henson ...................... 182/155
5,954,156 A    9/1999   Cooke
6,419,048 B1 * 7/2002   Robinson et al. ........ 182/182.1

FOREIGN PATENT DOCUMENTS

| EP | 1 149 669 A1 | 10/2001 |
|---|---|---|
| FR | 2 376 356 | 7/1978 |
| FR | 2 754 877 | 4/1998 |
| GB | 2 020 545 A | 11/1979 |
| GB | 2 337 692 A | 12/1999 |

* cited by examiner

Primary Examiner—Hugh B. Thompson, II
(74) Attorney, Agent, or Firm—Young & Thompson

(57) ABSTRACT

A support includes at least a vertical member and at least two pivoting legs, each leg being bent in its upper part. At least one of the pivoting legs has a circular cross-section at its bent upper part, and the vertical member has on its surface facing the bent upper part, a piece with U-shaped cross-section; and at least another of the pivoting legs has, at its bent upper part, a screw perpendicular to the longitudinal axis of the bent upper part.

20 Claims, 3 Drawing Sheets

SUPPORT SUCH AS A TRESTLE OR A STEPLADDER

This application is a continuation-in-part of PCT/FR01/01727, filed Jun. 5, 2001.

BACKGROUND OF THE INVENTION

The present invention relates to a support comprising at least two pivoting legs, these legs being adapted to pivot between a folded position and an unfolded position.

This support can in particular be a trestle or a table with four pivoting legs, a trestle comprising, at one longitudinal end, one or two fixed legs and, at its other longitudinal end, two pivoting legs, or a stepladder comprising two fixed legs on one lateral side and two pivoting legs on another lateral side.

A support of this type should comprise a foldable leg so as to be able to be stored in a small size. A conventional trestle is thus formed by two structures in the form of a frame, pivotally connected to each other at their upper portions, and adapted to be disposed either in a closed, folded position or in a spaced, unfolded position.

DESCRIPTION OF THE RELATED ART

A trestle of this type has the drawback of being unstable when the surface on which the trestle is disposed is not perfectly flat. This problem arises particularly for trestles for professional use such as those used at worksites.

Moreover, a conventional trestle is not perfectly adapted to receive relatively heavy loads.

The patent GB-A-2 020 545 discloses a tripod comprising a structure on which three legs are pivotally mounted; the structure has a vertical upright and each leg is bent at its upper portion, above the region by which it is connected to this upright, this bend being such that the upper bent portion of the leg comes to rest against said upright when the leg is unfolded.

The tripod according to this document is not adapted to be emplaced on an irregular surface nor to receive relatively heavy loads.

SUMMARY OF THE INVENTION

The present invention seeks to overcome these drawbacks, hence to provide a support which can be disposed stably on an irregular surface whilst being adapted to receive relatively heavy loads.

The support in question comprises, in a manner known per se, a structure on which at least two legs are pivotally mounted; the structure has at least one vertical upright and each leg comprises an upper portion located above the region by which it is connected to this upright, this upper portion being such that it bears against said upright when the leg is unfolded.

According to the invention:
  said upper portion of at least one of the pivoting legs has a portion of circular transverse cross-section, or the upright to which this leg is connected has a portion of circular transverse cross-section facing said upper portion of the pivoting leg;
  said upright comprises a piece of U shaped transverse cross-section fixed to it, or, respectively, said upper portion of the pivoting leg comprises this piece of U shaped cross-section; the two sidewalls of this piece of U shaped cross-section are disposed at a distance from each other less than the diameter of said circular transverse cross-section portion, the assembly being so shaped that, in the unfolded position of the leg, said portion of circular transverse cross-section will be bearing against said sidewalls of the U shaped piece, by being laterally wedged relative to this letter; and
  at least one other of the pivoting legs has, at its upper portion, a screw perpendicular to the longitudinal axis of this upper portion, this screw being adapted, when it is screwed in, to come to bear against the upright to which this leg is connected and thereby to define a fixed angular position of pivoting of the leg relative to this upright.

Said U shaped piece thus permits perfectly wedging the pivoting leg or legs cited above, in a maximum unfolded position, whilst the screw or screws of the other pivoting leg or legs permit fixing this or these other pivoting legs in angular positions adapted to the irregularities of the surface of the ground on which the support is disposed, so as to carry out the perfect wedging of this support.

The support according to the invention thus comprises:
  "bearing" legs which can be fixed and which include at least one pivoting leg adapted to be perfectly wedged laterally relative to the structure thanks to said U shaped member; said "bearing" legs forming a perfectly rigid structure;
  at least one "wedging" leg, adapted to be pivoted angularly relative to the structure, to permit, in coaction with the "bearing", a perfect wedging of the support, in a horizontal position of said structure.

According to one embodiment of the invention, said at least one pivoting leg has said portion of circular cross-section on its upper portion, and the upright to which this leg is connected comprises said piece of U shaped transverse cross-section.

According to another embodiment of the invention, said at least one pivoting leg comprises said piece of U shaped transverse cross-section on its upper portion, and the upright to which this leg is connected has said portion of circular transverse cross-section.

Preferably, each upright has a squared transverse section, and comprises at least one pair of tongues fixed to it, which form a stirrup for reception of a leg, said U shaped member being fixed to the upright by its intermediate wall, between the tongues.

Preferably, the two lateral walls of each U shaped member are positioned relative to each other such that their external surfaces come into immediate proximity with the internal surfaces of the tongues of the corresponding pair of tongues.

According to another characteristic of the invention, each leg has a tubular structure.

The upper portion of each leg provided with a screw can have, at this upper portion, a screw-threaded bore which passes through it, receiving said screw.

This screw can be a wing screw.

Moreover, each pivoting leg can have a pivoting foot at its internal end.

BRIEF DESCRIPTION OF THE DRAWINGS

The invention will be better understood, and other characteristics and advantages of it will appear, with reference to the accompanying schematic drawings; these drawings showing, by way of non-limiting examples, three possible embodiments of the support in question.

In the drawings.

In the different figures, identical portions are designated by the same reference numerals.

DESCRIPTION OF THE PREFERRED EMBODIMENTS

Figure 1:
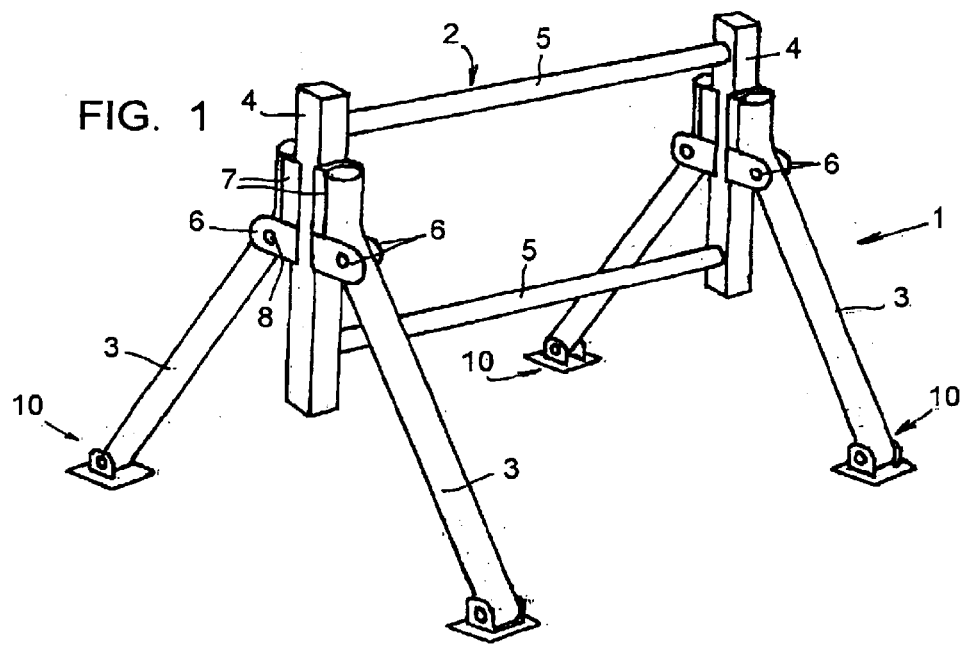
FIG. 1 is a perspective view of a trestle with four pivoting legs.
Figure 2:
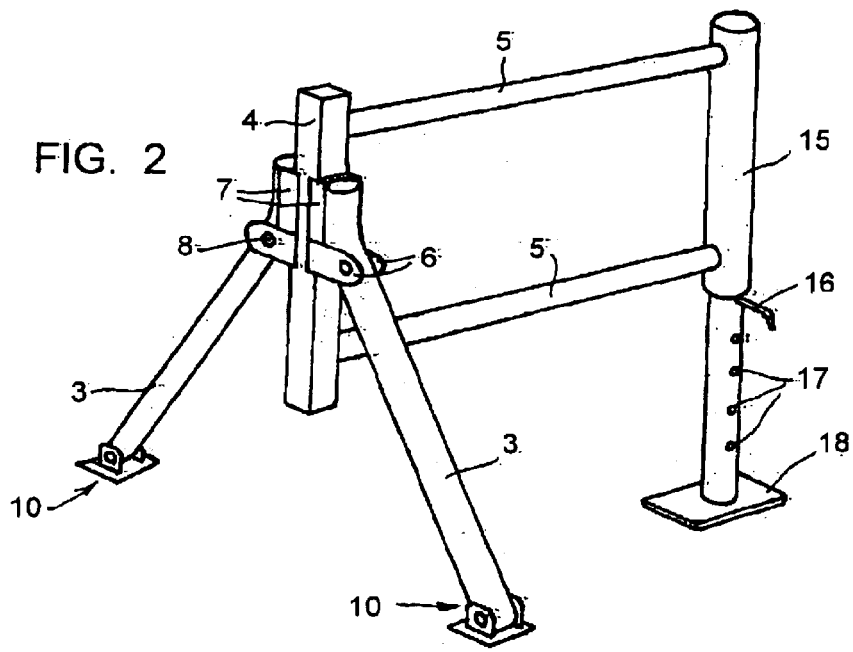
FIG. 2 is a perspective view of a trestle with two pivoting legs and with a fixed leg.
Figure 3:
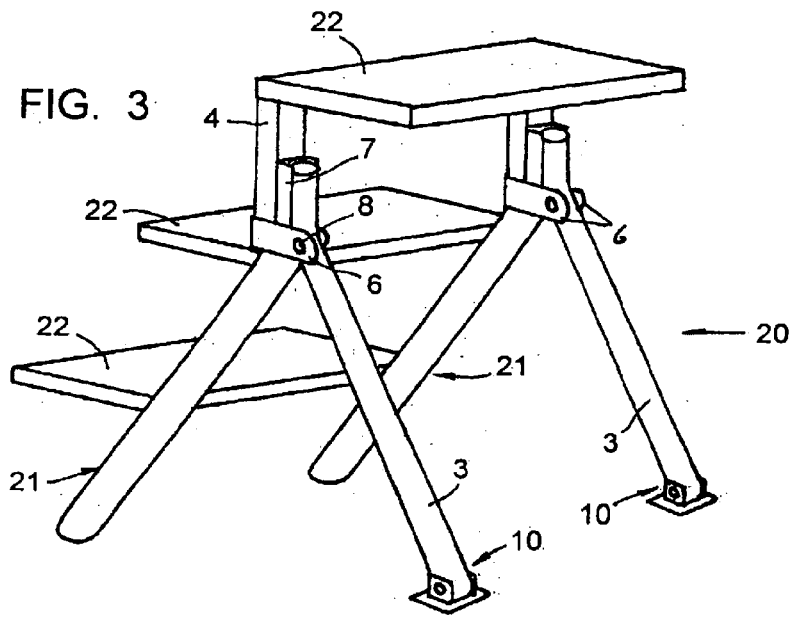
FIG. 3 is a perspective view of a stepladder with two pivoting legs.

FIGS. 1 to 3 show respectively different forms of practice of the invention. For simplification, the portions or elements which are identical or similar throughout the different embodiments, are designated by the same reference numerals.

FIG. 1 shows a trestle 1 of the type of those used at worksites, particularly used by painters to form a raised platform.

This trestle 1 comprises a central structure 2 and four pivoting legs 3.

The structure 2 is formed by two lateral uprights 4 of square cross-section and two crosspieces 5 connecting these uprights 4 to each other. These crosspieces 5 are parallel to each other.

Figure 4:
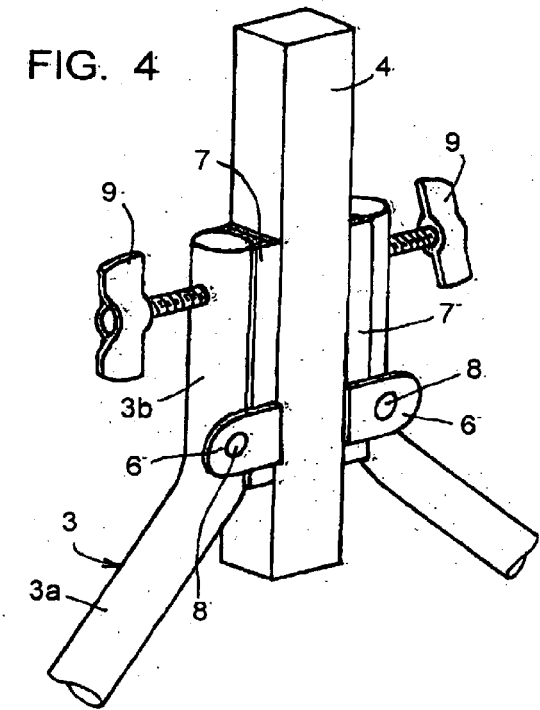
FIG. 4 is a perspective view of a detail on an enlarged scale.
Figure 5:
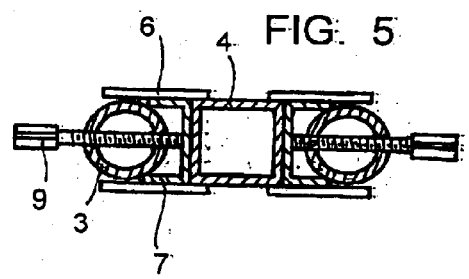
FIG. 5 is a cross-sectional view on the line V—V of FIG. 4.

As shown more particularly in FIGS. 4 and 5, each upright 4 comprises two pairs of tongues 6 fixed to it, forming stirrups for the reception of the legs 3. Each pair of tongues 6 is fixed to one surface of the upright 4 perpendicular to the longitudinal axis of the crosspieces 5, at the same height as the other pair of tongues 6, and projects from the upright 4 in a direction perpendicular to the longitudinal axis of the crosspieces 5. The tongues 6 of one upright 4 are positioned at the same height as the tongues 6 of the other upright 4.

Moreover, each upright 4 comprises two profiled members 7 of U shaped cross-section. Each member 7 is fixed to the upright 4 by its intermediate wall so that its internal quarter, approximately, is located at the level of the tongues 6. The two lateral walls of the member 7 are positioned relative to each other such that their external surfaces come into immediate proximity with the internal surfaces of the tongues 6, as is shown in FIG. 5.

The assembly of the structure 2 can be metallic, and the uprights 4, crosspieces 5, tongues 6 and pieces 7 can be fixed to each other by welding.

Each leg 3 has a tubular structure and is connected to the structure 2 by a transverse pin 8 engaged transversely relative to it, as well as through the two tongues 6 receiving this leg 3.

Each leg 3 is subdivided, substantially on opposite sides of the zone traversed by the pin 8, into a principal internal part 3a and a bent upper part 3b. As shown in the drawings, the bend formed in each leg 3 is such that the unfolded position of the legs 3 shown in FIGS. 1 and 4 gives good stability to the trestle 1.

This unfolded position is fixed by the portions 3b coming into bearing against the members 7.

With reference more particularly to FIG. 5, it will be seen that the external diameter of each leg 3 is slightly less than the distance separating the internal surfaces of the piece 7, such that the external diameter is greater than the distance separating the internal surfaces of the sidewalls of this piece 7. As a result, in the unfolded position of the legs 3 shown in FIGS. 1, 4 and 5, each portion 3b comes to bear against the end edges of these sidewalls of the corresponding member 7.

It will be seen from FIGS. 4 and 5 that the portion 3b of each leg 3 has, at the upper part of this portion 3b, a tapped bore passing through this portion 3b, oriented in a direction perpendicular to that of the pin 8. This tapped bore receives a wing screw 9. This screw 9 will come to bear, in the course of being screwed in, against the internal surface of the intermediate wall of the piece 7 thereby to permit predetermining a maximum unfolded position of the leg 3.

Moreover, each leg 3 has a pivoting foot 10 at its internal end. This foot 10 permits a stable bearing of the leg 3 on the ground, no matter what the angular position of the leg 3 relative to the structure 2, and permits avoiding reinforcement of the leg 3 in the case of soft ground.

In practice, the screws 9 are unscrewed, then the legs 3 are brought to the maximum pivoted position, in which they come into contact with the end edges of the sidewalls of the pieces 7. This contact along two separate lines ensures a perfect longitudinal wedging of the portions 3b, and hence of the legs 3, notwithstanding the play that can exist at the two pins 8. This wedging overcomes any risk of urging the tongues 6 to overhand when a large load is supported by the trestle 1.

The assembly formed by the legs 3 and by the structure 2 thus has a perfect rigidity despite said play.

In the case in which the ground on which the trestle 1 will be irregular, rendering the trestle unstable, the screw 9 of the leg 3 that is not in contact with the ground when the three other legs are in contact with the ground, can be screwed in so as to cause this leg 3 to pivot to bring it into an angular position in which the foot 10 of this leg 3 comes into contact against the ground.

A perfect stability of the trestle 1 is thus obtained, combined with a perfect rigidity of the assembly formed by the structure 2 and the legs 3.

The trestle 1 is then in position to receive relatively heavy loads even in the case of irregular ground, under perfect conditions of stability.

FIG. 2 shows a trestle 1 similar to that which has been described, but comprises two legs 3 on one longitudinal side and one telescopic single leg 15 on the other longitudinal end. This leg 15 is adjustable in height by means of a pin 16 and a series of holes 17, and comprises a internal plate 18 forming a base for bearing on the ground.

FIG. 3 shows a stepladder 20 comprising two pivoting legs 3 on one lateral side. The structure 2 is thus formed by two uprights 21 which are bent to define upper portions forming the uprights 4 and internal fixed legs 3. The two uprights 21 are connected by crosspieces receiving plates 22 which form the steps of the stepladder 20.

Figure 6:
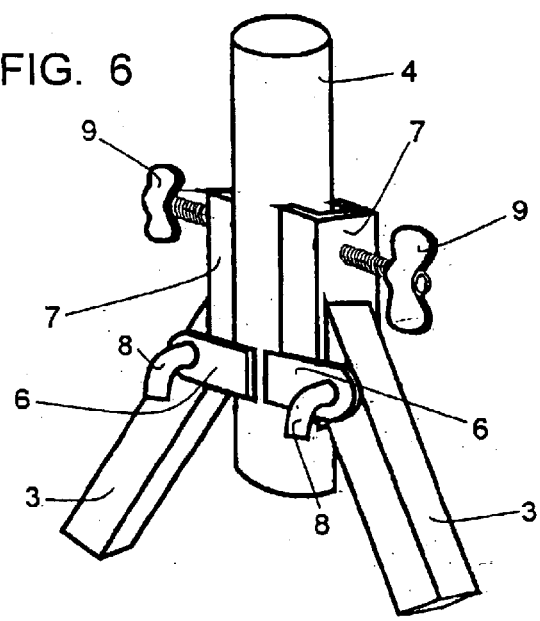
FIG. 6 is a view similar to FIG. 4, according to a modified embodiment.

FIG. 6 shows a modified embodiment in which each upright 4 has a circular transverse cross-section and each piece 7 is secured to the upper portion of each leg 3.

Figure 7:
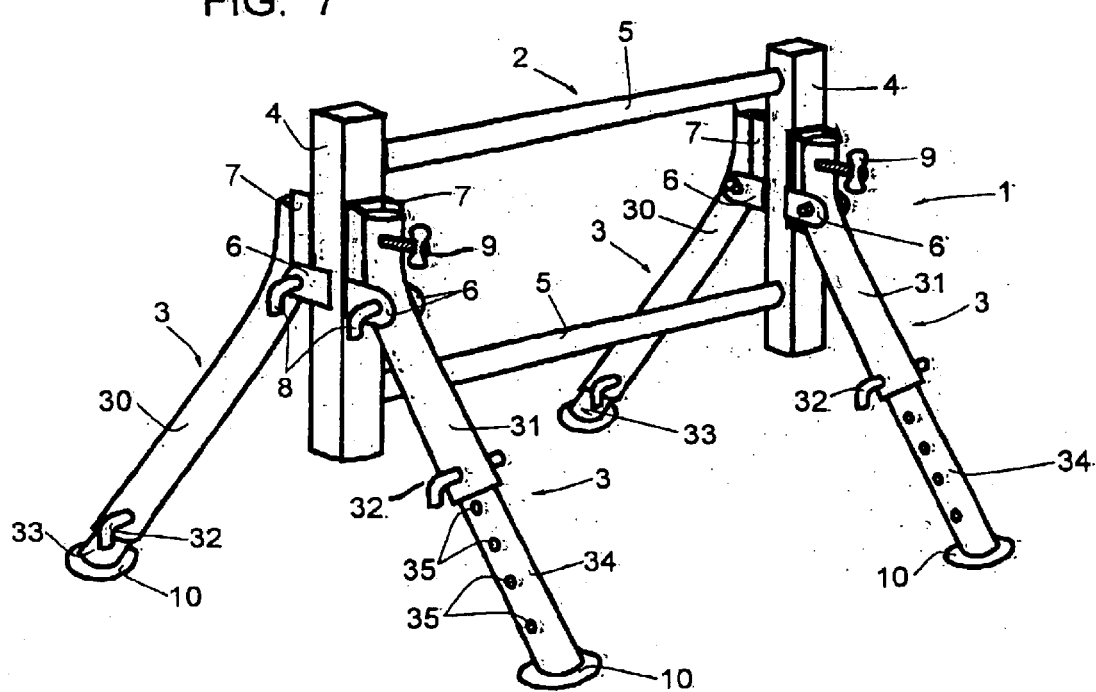
FIG. 7 is a view similar to FIG. 1, according to another modified embodiment.

FIG. 7 shows a trestle 1 comprising telescopic pivoting legs 3, of which two comprise upper external "long" tubes 30 and the two other, "short" outer upper tubes 31.

The outer tubes 30, 31 comprise, at their internal portion, holes for reception of a pin 32 for blocking and the internal tubes 33, 34 comprise staged transverse holes 35 that can come into registry with said holes on the outer tubes 30, 31 and receive the pin 32 through them. This latter thus permits immobilization of an internal tube 33, 34 relative to a corresponding external tube 30, 31.

The internal tubes comprise feet 10 at their lower ends.

These telescopic legs 3 permit the trestle 1 to bear on a slanting or irregular surface, or for example on a stepladder.

Thus it will be seen from the preceding, that the invention provides a support having, relative to similar supports in the prior art, the definite advantage of being able to be disposed in a stable manner on an irregular surface while being able to receive relatively heavy loads.

It follows that the invention is not limited to the embodiment described above by way of example but that it includes on the contrary all modifications of embodiment within the scope of protection defined by the accompanying claims.

What is claimed is:

1. Support, comprising:
   a structure having at least one vertical upright;
   at least two pivoting legs pivotally mounted on the structure;
   each leg connected to the vertical upright at a region,
   each leg comprising an upper portion located above the region,
   the upper portion of each leg bearing against said upright when each leg is in an unfolded position;
   said upper portion of at least one of the pivoting legs having a portion of circular cross-section, or the upright having a portion of transverse circular cross-section facing said upper portion of the at least one pivoting leg;
   a piece of a U shaped transverse cross-section member fixed to said upright, or, respectively, said upper portion of the at least one pivoting leg comprises a piece of a transverse U shaped cross-section member;
   two sidewalls of said U shaped members being disposed at a distance from each other less than the diameter of said portion of said circular transverse cross-section,
   in the unfolded position of the at least on pivoting leg, said portion of circular transverse cross-section bearing against said sidewalls of said U shaped members, the at least one pivoting leg being laterally wedged relative to the portion of circular transverse cross-section and the U shaped members; and
   at least one other of the pivoting legs has, at the upper portion, a screw perpendicular to the longitudinal axis of the upper portion, said screw being adapted, when screwed in, to come into bearing against the upright to which the other leg is connected and thereby to define a fixed angular position of pivoting of the other leg relative to the upright.

2. Support according to claim 1, in which said at least one pivoting leg has said portion of circular transverse cross-section in the upper portion, and the upright to which said at least one pivoting leg is connected comprises said member of U shaped transverse cross-section.

3. Support according to claim 2, in which each upright has a squared transverse cross-section, and comprises at least one pair of tongues fixed to the squared cross-section, which tongues form a stirrup for reception of a leg between said tongues, said U shaped member being secured to the upright by an intermediate wall between said tongues.

4. Support according to claim 3, in which the two sidewalls of each U shaped member are positioned relative to each other such that outer surfaces of the sidewalls come into immediate adjacency with internal surfaces of the tongues of the corresponding pair of tongues.

5. Support according to claim 1, in which said at least one pivoting leg comprises said member of U shaped transverse cross-section in the upper portion, and the upright to which said at least one pivoting leg is connected has said portion of circular transverse cross-section.

6. Support according to claim 1, in which each leg has a tubular structure.

7. Support according to claim 1, in which the upper portion of each leg provided with a screw has a screw-threaded bore passing through the upper portion, receiving said screw.

8. Support according to claim 1, in which said screw is a wing screw.

9. Support according to claim 1, in which each pivoting leg has a pivoting foot at a lower end.

10. Support according to claim 1, in which the pivoting legs are telescopic.

11. Support, comprising:
    a structure having at least one vertical upright;
    legs pivotally mounted on the structure;
    each leg connected to the vertical upright at a first region,
    each leg comprising an upper portion located above the first region,
    the upper portion of at least one leg bearing against said upright when the at least one leg is in an unfolded position,
    one of the upper portion of the at least one leg and the upright having a circular transverse cross-section portion located above the first region;
    a U-shaped transverse cross-section member located intermediate the upright and the upper portion,
    two sidewalls of the U-shaped member being disposed at a distance from each other less than the diameter of the circular portion,
    in the unfolded position of the at least one leg, the circular portion bearing against the two sidewalls of the U-shaped member to laterally wedge the at least one leg relative to the U-shaped member; and
    a screw extending through the upper portion of the at least one leg perpendicular to the longitudinal axis of the upper portion,
    the screw, when in a screwed-in position, bearing against the upright and defining a fixed angular position of pivoting of the at least one leg relative to the upright.

12. Support according to claim 11, wherein,
    the legs have the circular portion, and
    the upright comprises the U-shaped member.

13. Support according to claim 11, wherein,
    the upright has a squared transverse cross-section and comprises at least one pair of tongues,
    the tongues form a stirrup for reception of one leg.

14. Support according to claim 13, wherein,
    the two sidewalls of each U-shaped member come into immediate adjacency with internal surfaces of the tongues of the corresponding pair of tongues.

15. Support according to claim 11, wherein,
    each leg has a tubular structure,
    the upper portion of each leg has a screw-threaded bore.

16. Support according to claim 11, in which each leg has a pivoting foot at a lower end.

17. Support according to claim 11, in which the pivoting legs are telescopic.

18. Support, comprising:
    a structure having a vertical upright;
    legs pivotally mounted on the structure;
    each leg connected to the vertical upright at a first region,
    each leg comprising an upper portion located above the first region,
    the upper portion of at least one leg bearing against said upright when the at least one leg is in an unfolded position,
    one of the upper portion of the at least one leg and the upright having a circular transverse cross-section portion located above the first region;

a U-shaped member located intermediate the upright and the upper portion, the U-shaped member having two sidewalls, in the unfolded position of the at least one leg, the circular portion bearing against the two sidewalls of the U-shaped member to laterally wedge the leg relative to the U-shaped member; and a screw extending through the upper portion of the at least one leg perpendicular to the longitudinal axis of the upper portion, the screw, when in a screwed-in position, bearing against the upright and defining a fixed angular position of pivoting of the at least one leg relative to the upright.

19. Support according to claim 18, wherein, the legs have the circular portion, the upright comprises the U-shaped member, the upright has a squared transverse cross-section and comprises at least one pair of tongues, the tongues form a stirrup for reception of one leg.

20. Support according to claim 18, wherein, each leg has a tubular structure, and each leg is telescopic.

* * * * *